(12) United States Patent
Hirota et al.

(10) Patent No.: US 11,683,091 B2
(45) Date of Patent: Jun. 20, 2023

(54) COMMUNICATION APPARATUS IDENTIFICATION DEVICE, OPTICAL FIBER CONNECTION SYSTEM, COMMUNICATION APPARATUS IDENTIFICATION METHOD, AND OPTICAL FIBER CONNECTION METHOD

(71) Applicant: NIPPON TELEGRAPH AND TELEPHONE CORPORATION, Tokyo (JP)

(72) Inventors: Hidenobu Hirota, Musashino (JP); Takui Uematsu, Musashino (JP); Hiroyuki Iida, Musashino (JP); Naotsugu Ambe, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/619,610

(22) PCT Filed: Jun. 18, 2019

(86) PCT No.: PCT/JP2019/024004
§ 371 (c)(1),
(2) Date: Dec. 16, 2021

(87) PCT Pub. No.: WO2020/255235
PCT Pub. Date: Dec. 24, 2020

(65) Prior Publication Data
US 2022/0352980 A1    Nov. 3, 2022

(51) Int. Cl.
*H04B 10/079* (2013.01)
(52) U.S. Cl.
CPC ................. *H04B 10/079* (2013.01)

(58) Field of Classification Search
CPC .................................................. H04B 10/079
(Continued)

(56) References Cited

U.S. PATENT DOCUMENTS

| 11,385,424 B2 * | 7/2022 | Uematsu | ............... G01M 11/00 |
| 2022/0116109 A1 * | 4/2022 | Uematsu | ............. H04B 10/272 |

(Continued)

FOREIGN PATENT DOCUMENTS

| CN | 101964680 B | * 12/2013 |
| JP | S63241514 A | 10/1988 |

(Continued)

OTHER PUBLICATIONS

Takui et al; Design of a Temporary Optical Coupler Using Fiber Bending for Traffic Monitoring; Dec. 2017; IEEE; pp. 1-14. (Year: 2017).*

(Continued)

*Primary Examiner* — Amritbir K Sandhu
(74) *Attorney, Agent, or Firm* — Harness, Dickey & Pierce, P.L.C.

(57) ABSTRACT

The present disclosure has an object to provide a technique for enabling a communication state to be confirmed not in a communication building but in a work site, and to provide a technique for enabling correct splicing between optical cables to be confirmed before fusion splicing. The present disclosure is a communication apparatus identification device 4 including an optical fiber bent portion 42 obtained by, when a portion of optical fibers to which communication apparatuses (the OLT 1-2 and the ONU 2) for which appropriateness of connection is to be determined are connected on opposite ends is bent, bending a portion of the optical fibers in a vicinity of a clearance provided between the optical fibers, the clearance having a range in which the communication apparatuses for which appropriateness of (Continued)

connection is to be determined can communicate with each other, and a MAC address analysis unit 43 that analyzes communication light leaked out of the bent portion of the optical fibers in the vicinity of the clearance to acquire identification numbers (MAC addresses) of the communication apparatuses for which appropriateness of connection is to be determined.

15 Claims, 10 Drawing Sheets

(58) Field of Classification Search
USPC .......................................................... 398/28
See application file for complete search history.

(56) References Cited

U.S. PATENT DOCUMENTS

2022/0166502 A1* 5/2022 Hirota .................. G02B 6/2852
2022/0352980 A1* 11/2022 Hirota .................. H04B 10/079

FOREIGN PATENT DOCUMENTS

JP          2012060290 A  *  3/2012
JP          2017036985 A  *  2/2017
WO     WO-2018042795 A1    3/2018

OTHER PUBLICATIONS

Takui et al; Design of a Temporary Optical Coupler Using Fiber Bending for Traffic Monitoring; Dec. 2017; IEEE Photonics Journal; pp. 1-14. (Year: 2017).*

Hidenobu Hirota et al., Optical Cable Changeover Tool with Light Injection and Detection Technology, Journal of Lightwave Technology, vol. 34, No. 14, 2016, pp. 3379-3388.

Kazuo Watanabe et al., The development of optical signal monitor in GE-PON, IEICE Technical Report, vol. 111, No. 246, 2011, pp. 31-34.

Hidenobu Hirota et al., Acquisition for MAC Address with Local Detection Technology, 2017 IEICE General Conference, Mar. 22, 2017, p. 367.

* cited by examiner (a) ACQUIRE MAC ADDRESSES OF OLT 1-1 AND ONU 2 THROUGH COMMUNICATION BETWEEN THEM BEFORE CHANGEOVER (b) CUT OPTICAL FIBER (c) CHANGEOVER TO OLT 1-2 SIDE, CORRECT CONNECTION (d) CHANGEOVER TO OLT 1-2 SIDE, CORRECT CONNECTION (e) CHANGEOVER TO OLT 1-3 SIDE, INCORRECT CONNECTION

COMMUNICATION APPARATUS IDENTIFICATION DEVICE, OPTICAL FIBER CONNECTION SYSTEM, COMMUNICATION APPARATUS IDENTIFICATION METHOD, AND OPTICAL FIBER CONNECTION METHOD

CROSS-REFERENCE TO RELATED APPLICATIONS

This application is a 371 U.S. National Phase of International Application No. PCT/JP2019/024004 filed on Jun. 18, 2019. The entire disclosures of the above applications are incorporated herein by reference.

TECHNICAL FIELD

The present disclosure relates to a technique for determining appropriateness of connection between communication apparatuses.

BACKGROUND ART

An optical access network provides a facility illustrated in FIG. 1 to provide users with the Internet and telephone services. An optical line terminal (OLT) 1 which is a communication apparatus is placed in a communication building, and an optical network unit (ONU) 2 is placed in a user's house. The OLT 1 and the ONU 2 are connected using an IDM, an optical cable 3, and a splitter. Communication light having wavelengths of 1490 nm and 1550 nm is output from the OLT 1 side, and communication light having a wavelength of 1310 nm is output from the ONU 2 side, so that the OLT 1 and the ONU 2 recognize each other, and high-speed broadband services for the Internet, telephone, and the like are provided for the customer.

However, the building in which the OLT 1 which is a communication facility is placed is composed of concrete and metal, and is always present in an external environment without having a roof or the like, which is therefore easily deteriorated. That is, concrete constituting the communication building is cracked, and the building itself is deteriorated. If it rains, it is easily expectable that water enters the deteriorated building through cracks. This water is troublesome for the OLT 1 placed in the communication building. For example, when water contacts a communication apparatus (for example, the OLT 1), it is easily expectable that the communication apparatus is shorted as it is electrically driven, and the communication apparatus breaks down.

Therefore, giving up using the deteriorated communication building, a new communication building is built, and an OLT which is a communication apparatus is transferred into the new building (see FIG. 2). This transfer neither involves removing the communication apparatus (for example, OLT) in the deteriorated building nor bringing and placing the removed apparatus in the new building because the work period will be prolonged. Consequently, a new communication apparatus is placed in the new building to shorten the work period. In order to differentiate between the OLT in the deteriorated building and the OLT in the new building, the OLT placed in the deteriorated building will be denoted by an OLT 1-1, and the OLT placed in the new building will be denoted by an OLT 1-2.

CITATION LIST

Non-Patent Literature

Non-Patent Literature 1: H. Hirota, T. Kawano, M. Shinpo, K. Noto, T. Uematsu, N. Honda, T. Kiyokura, and T. Manabe, "Optical Cable Changeover Tool With Light Injection and Detection Technology," Journal of Lightwave Technology, Vol. 34, No. 14, pp. 3379-3388, 2016.

Non-Patent Literature 2: K. Watanabe, H. Takahashi, H. Takamori, and T. Ueda, "Hikari Kyapucha Souchi no Kaihatsu (in Japanese)" (Development of Optical Capture Device), Technical Committee on Optical Fiber Technologies, pp. 31-34, 2011-10 (2011).

SUMMARY OF THE INVENTION

Technical Problem

Transfer from the deteriorated old building to the new building is performed by changing joining between optical cables 3 as illustrated in FIG. 3. A point of changing joining is carried out outside the communication building, an optical cable 3-1 joined to the old building is cut, and changeover to an optical cable 3-2 joined to the new building is performed. The new optical cable 3-2 is previously interconnected from a communication apparatus in the new building. As the changeover operation, fibers of the optical cable 3-1 extending to the old building are cut, and then joined to fibers of the new optical cable 3-2 interconnected in advance. A joining action is fusion splicing of melting the optical fibers at a high temperature to splice them. FIG. 4 illustrates the procedure of fusion splicing. In FIG. 4, a first optical fiber glass 3-1 as the old optical cable 3-1 and a second optical fiber glass 3-2 as the new optical cable 3-2 are fusion spliced.

Currently, in order to confirm that the optical cables 3 have been correctly joined after fusion splicing, a communication state of the OLT 1 and the ONU 2 is monitored. FIG. 5 illustrates an example of monitoring. That is, when the OLT 1 and the ONU 2 start communication after splicing to the new optical cable 3-2 side is performed, it is considered that splicing of the optical cables 3 has been terminated as designed, and the work of splicing the optical cables 3 has been completed. In the current method, confirmation can be performed only after the optical cables 3 are spliced. Furthermore, an operator is assigned in a communication building away from a work site to confirm the communication state of the OLT 1. A first problem lies in that it is not possible to confirm splicing of the optical cables 3 solely at the work site.

Another problem will be described. At the current technical level, in a case where the optical cables 3 are not joined correctly, the work is performed again until correct splicing is achieved. Since splicing of the optical cables 3 is incorrect, the reworking involves cutting an incorrectly joined one of the optical cables 3. Then, an optical cable 3 which is a correct splicing target is found, and splicing is performed. Consequently, return work occurs. That is, this causes a delay in the work. Consequently, a second problem lies in that appropriateness of connection is determined after the optical cables 3 are fusion spliced. If appropriateness of connection can be determined correctly before fusion, the second problem can be solved.

Therefore, in order to solve the aforementioned problems, the present disclosure has an object to provide a technique for enabling a communication state to be confirmed not in a communication building but in a work site, and to provide a technique for enabling correct splicing between optical cables to be confirmed before fusion splicing.

Means for Solving the Problem

In order to solve the aforementioned problems, a clearance having a range in which communication apparatuses for which appropriateness of connection is to be determined can communicate with each other is provided between optical fibers, and a portion of the optical fibers in the vicinity of the clearance is bent. Then, communication light leaked out of the bent portion of the optical fibers in the vicinity of the clearance is analyzed to acquire identification numbers of the communication apparatuses for which appropriateness of connection is to be determined.

Specifically, the present disclosure is a communication apparatus identification device including an optical fiber bent portion obtained by, when a portion of optical fibers to which communication apparatuses for which appropriateness of connection is to be determined are connected on opposite ends is bent, bending a portion of the optical fibers in a vicinity of a clearance provided between the optical fibers, the clearance having a range in which the communication apparatuses for which appropriateness of connection is to be determined can communicate with each other, and an identification number analysis unit that analyzes communication light leaked out of the bent portion of the optical fibers in the vicinity of the clearance to acquire identification numbers of the communication apparatuses for which appropriateness of connection is to be determined.

Specifically, the present disclosure is a communication apparatus identification method sequentially including an optical fiber bending step of, when a portion of optical fibers to which communication apparatuses for which appropriateness of connection is to be determined are connected on opposite ends is bent, bending a portion of the optical fibers in a vicinity of a clearance provided between the optical fibers, the clearance having a range in which the communication apparatuses for which appropriateness of connection is to be determined can communicate with each other, and an identification number analysis step of analyzing communication light leaked out of the bent portion of the optical fibers in the vicinity of the clearance to acquire identification numbers of the communication apparatuses for which appropriateness of connection is to be determined.

Effects of the Invention

As described above, the present disclosure can provide a technique for enabling a communication state to be confirmed not in a communication building but in a work site, and to provide a technique for enabling correct splicing between optical cables to be confirmed before fusion splicing.

DESCRIPTION OF EMBODIMENTS

Referring to the attached drawings, an embodiment of the present disclosure will be described. The embodiment which will be described below is an example of embodying the present disclosure, and the present disclosure is not restricted to the following embodiment.

Description of Principle

Figure 1:
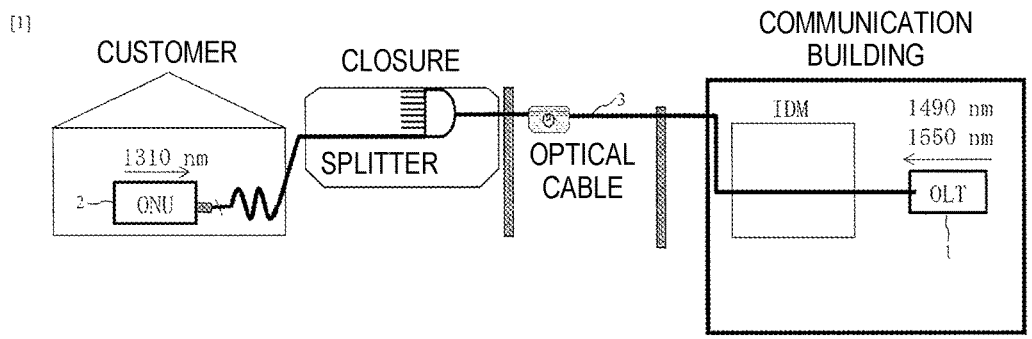
FIG. 1 is a drawing illustrating a configuration of an optical access network according to a conventional technique.
Figure 2:
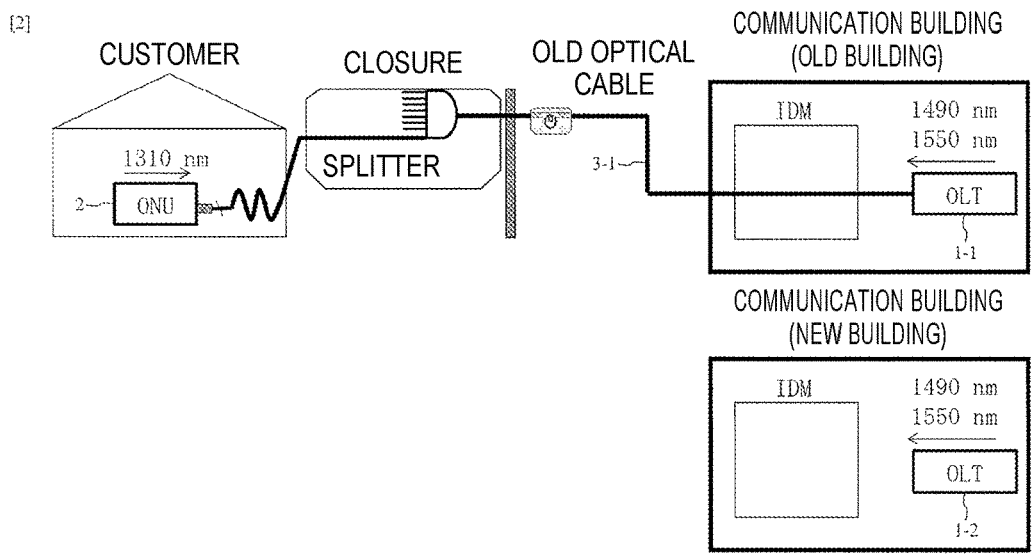
FIG. 2 is a drawing illustrating a state before changeover between communication buildings in the optical access network according to the conventional technique.
Figure 3:
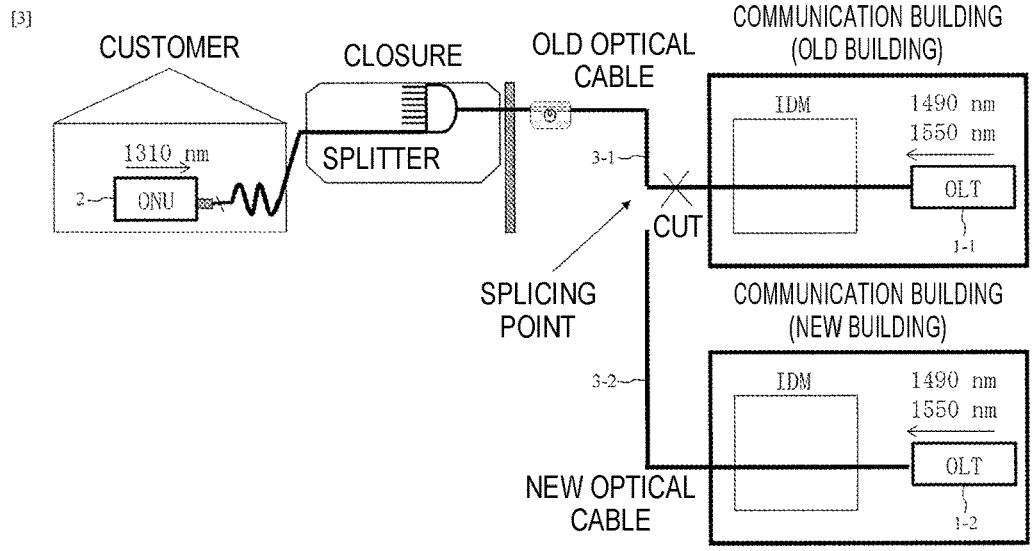
FIG. 3 is a drawing illustrating a state during changeover between the communication buildings in the optical access network according to the conventional technique.
Figure 4:
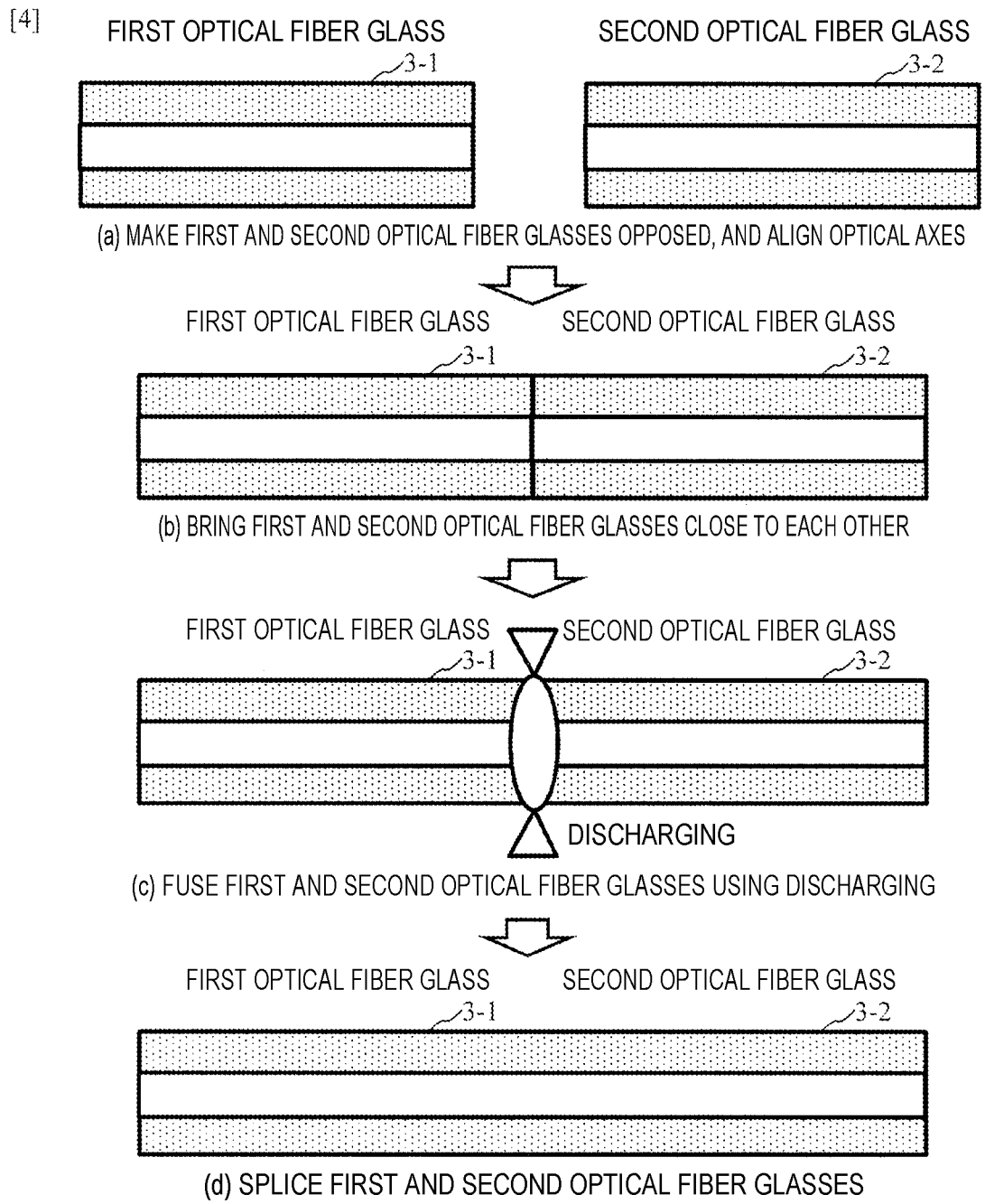
FIG. 4 is a drawing illustrating a method of splicing optical fibers according to the conventional technique.
Figure 5:
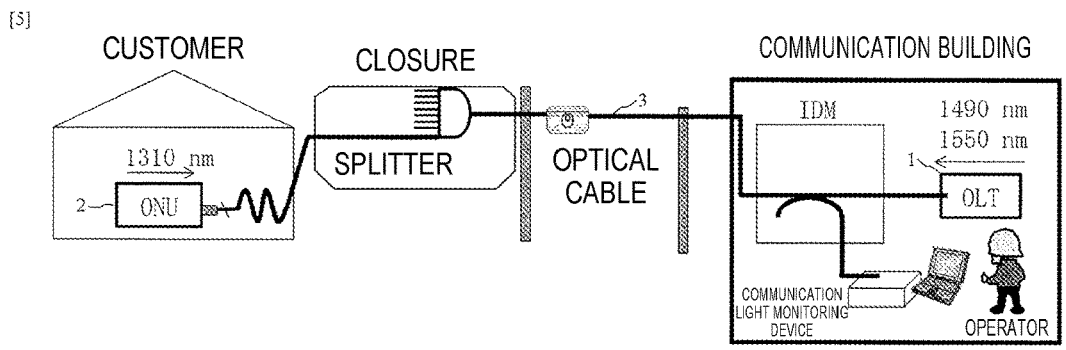
FIG. 5 is a drawing illustrating a state after changeover between the communication buildings in the optical access network according to the conventional technique.

Since an optical fiber is limited in length, many optical fibers are joined together and extended to form an optical access network. As one of means for extending optical fibers, a fusion splicing technique is exemplified. The method of fusion splicing involves aligning opposed optical fibers with high accuracy, and making cores of the optical fibers abut on each other. Thereafter, optical fiber glasses are melted at a high temperature to join the optical fibers, which is a conventional technique illustrated in FIG. 4.

Figure 6:
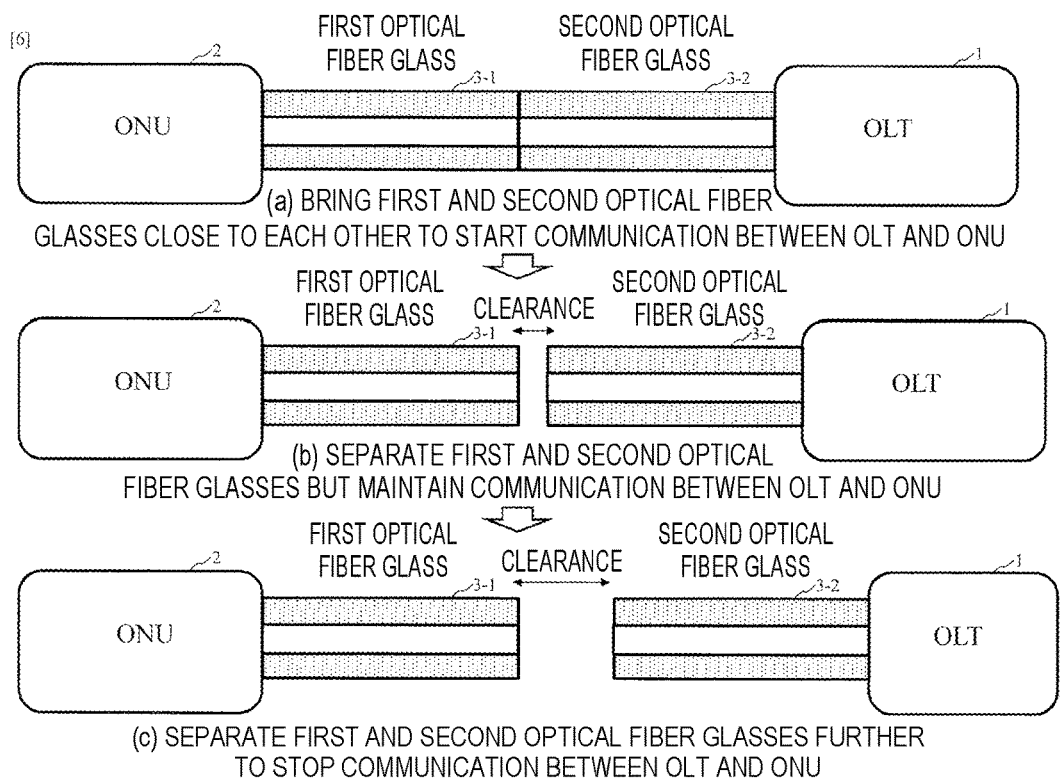
FIG. 6 is a drawing illustrating the principle of a communication apparatus identification method according to the present disclosure.

We have studied communication between the OLT 1 and the ONU 2 when one of optical fibers before being fused, that is, opposed optical fibers, is moved back to intentionally provide a clearance between the optical fibers. The result is illustrated in FIG. 6. When the clearance between the first and second optical fiber glasses 3-1 and 3-2 is increased, a loss is increased as may be expected to cause communication to stop. However, if the loss is small even if there is the clearance, communication between the OLT 1 and the ONU 2 is maintained. We have found out that even if there is a space between the opposed first and second optical fiber glasses 3-1 and 3-2, the OLT 1 and the ONU 2 maintain communication. We have confirmed that even if there is a space between the first and second optical fiber glasses 3-1 and 3-2, communication is not affected and can be maintained as communication light propagates through the space. However, we also have confirmed that if one of the first and second optical fiber glasses 3-1 and 3-2 is moved back further to increase the distance between the first and second optical fiber glasses 3-1 and 3-2 to separate them, the loss is increased due to the space, and communication between the OLT 1 and the ONU 2 stops at a certain distance. In optical communication, even if a space is left between the opposed first and second optical fiber glasses 3-1 and 3-2, communication between the OLT 1 and the ONU 2 can be maintained as communication light propagates through the space.

Figure 7:
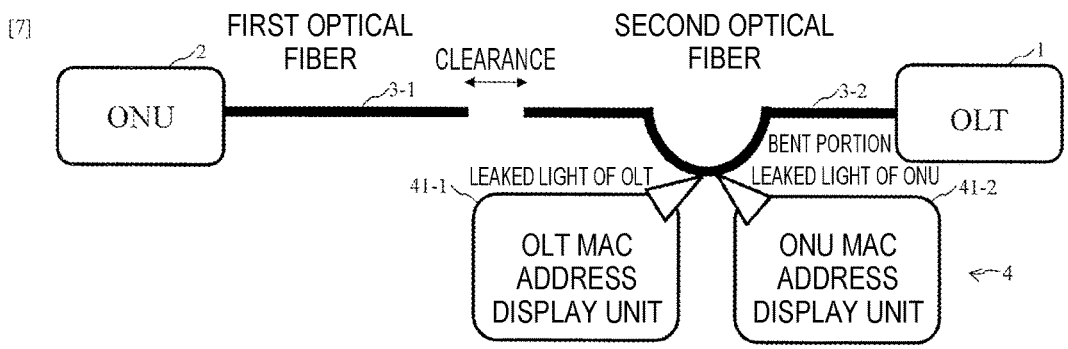
FIG. 7 is a drawing illustrating the principle of the communication apparatus identification method according to the present disclosure.

FIG. 7 illustrates an overview of the present invention. In a form in which, for the opposed first and second optical fibers 3-1 and 3-2, a clearance is provided between the first and second optical fibers 3-1 and 3-2, and communication between the OLT 1 and the ONU 2 is maintained, the second optical fiber 3-2 on one side is bent. When the second optical fiber 3-2 is bent, communication light confined in the core of the second optical fiber 3-2 leaks out of the core, and thus leaks out of the second optical fiber 3-2 itself. That is, when the second optical fiber 3-2 is bent, a signal output from the ONU 2 and a signal output from the OLT 1 each leak out at the bent portion of the second optical fiber 3-2. Each of the leaked signals is received by a communication apparatus identification device 4. Communication light from the OLT 1 and the ONU 2 contains media access control addresses (MAC addresses) which are numbers assigned to the respective communication apparatuses, and the MAC addresses are displayed on MAC address display units 41-1 and 41-2.

The characteristic of the MAC address is that it is a number assigned to a communication apparatus and used for identification. Furthermore, the MAC address is unique with respect to another apparatus number. That is, an independent number is assigned. If the second optical fiber 3-2 is bent, and the MAC addresses of the OLT 1 and the ONU 2 can be acquired, the ONU 2 and the OLT 1 respectively joined to the opposite ends of the first and second optical fibers 3-1 and 3-2 can be specified. That is, if the first and second optical fibers 3-1 and 3-2 are interconnected (through the clearance), the connected communication apparatuses are recognized even in a work site.

Description of Procedure at Changeover

Figure 8:
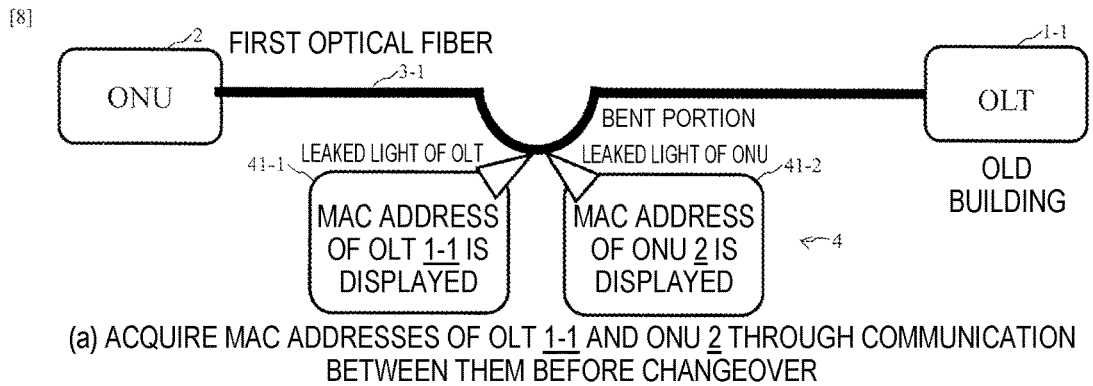
FIG. 8 is a drawing illustrating a state before changeover between communication buildings in an optical access network according to the present disclosure.
Figure 8:
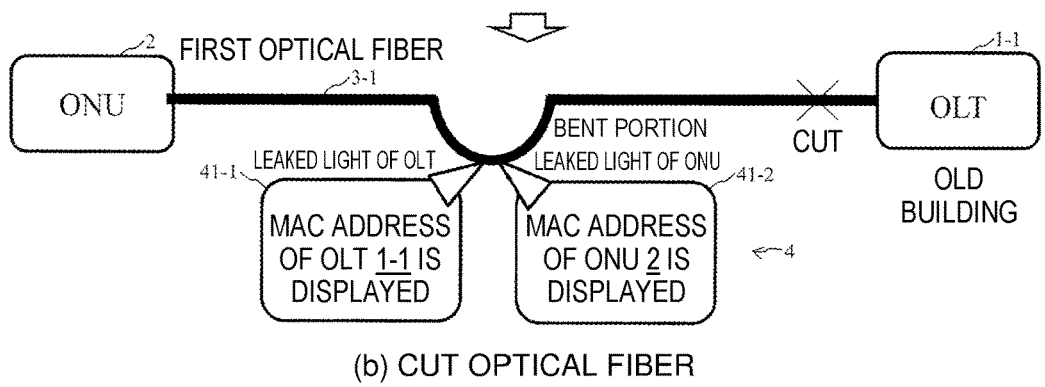
Figure 9:
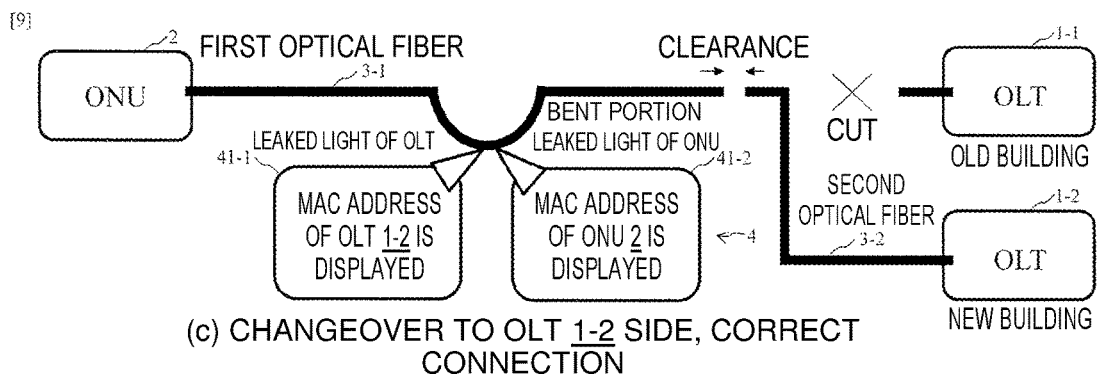
FIG. 9 is a drawing illustrating a state during changeover between the communication buildings in the optical access network according to the present disclosure.
Figure 9:
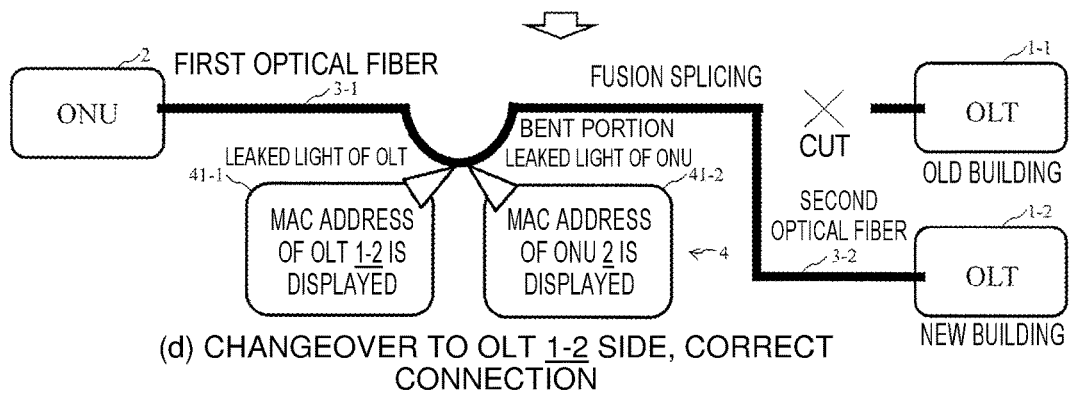
Figure 10:
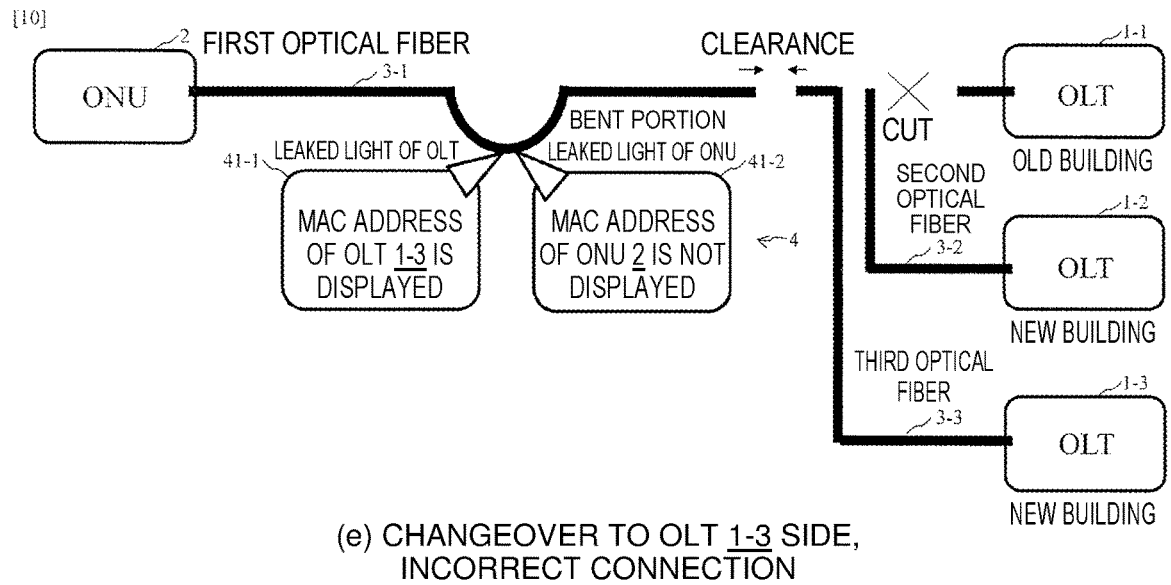
FIG. 10 is a drawing illustrating a state during changeover between the communication buildings in the optical access network according to the present disclosure.

Determination of correctness of splicing between optical fibers through use of MAC addresses will be illustrated using FIGS. 8 to 10. FIG. 8(*a*) illustrates a state in which the OLT 1-1 placed in an old building and the ONU 2 maintain communication, and a portion of the first optical fiber 3-1 connecting the OLT 1-1 and the ONU 2 is bent to intentionally cause communication light to leak out. The MAC addresses of the OLT 1-1 and the ONU 2 contained in the leaked light are displayed on the MAC address display units 41-1 and 41-2. The indication on the MAC address display unit 41-1 that the MAC address of the OLT 1-1 is displayed means that the MAC address of the OLT 1-1 has been acquired and displayed at the position where the first optical fiber 3-1 is bent. The same applies to the ONU 2. In FIG. 8(*b*), the first optical fiber 3-1 is cut.

FIG. 9(*c*) illustrates transfer to the OLT 1-2 side placed in a new building, and the second optical fiber 3-2 joined to the OLT 1-2 and the first optical fiber 3-1 joined to the ONU 2 are brought close to each other to cause the OLT 1-2 and the ONU 2 to communicate with each other. Since the OLT 1-2 recognizes the ONU 2 by inputting information about the ONU 2 to the OLT 1-2 side in advance, the OLT 1-2 and the ONU 2 start communication. At this time, since the first optical fiber 3-1 has been bent, the MAC addresses which are communication apparatus numbers of the OLT 1-2 and the ONU 2 are displayed on the MAC address display units 41-1 and 41-2. Since communication has been already started, display of the MAC addresses indicates that a scheduled work is progressing, but to make extra sure, it is confirmed on a design drawing whether the displayed MAC addresses have no problem to ensure thorough confirmation. FIG. 9(*d*) illustrates performing fusion splicing which is the next step after the confirmation. That is, since communication between the OLT 1-2 and the ONU 2 has been established before fusion splicing, return work is eliminated.

FIG. 10(*e*) illustrates a case in which a connected OLT is incorrect. It is illustrated that although the OLT 1-2 has been intended to be connected, the OLT 1-3 is connected incorrectly. The first optical fiber 3-1 is also bent to acquire leaked light. Since the ONU 2 is not scheduled to be connected to the OLT 1-3, information about the ONU 2 is not registered in the OLT 1-3. It has been described so far that when the first and second optical fibers 3-1 and 3-2 are brought close to each other, communication between the OLT 1-2 and the ONU 2 starts, and their MAC addresses can be acquired, but this does not apply to the case in FIG. 10(*e*). Specifically, the OLT 1-3 and the ONU 2 do not recognize each other, so that communication is not established. However, as a characteristic of the OLT, the OLT has a characteristic of continuing outputting an optical signal. That is, since the optical signal is being output from the OLT 1-3, the MAC address of the OLT 1-3 can be acquired at the bent portion of the first optical fiber 3-1. On the other hand, since the ONU 2 cannot output an optical signal, the MAC address of the ONU 2 cannot be acquired. That is, in the incorrect case, the MAC address of the OLT 1-3 can be acquired, while the MAC address of the ONU 2 cannot be acquired. Consequently, when the MAC address of the OLT 1-3 alone is displayed on the MAC address display unit 41-1, it is understood that connection is incorrect. Consequently, a characteristic of the present invention lies in that an operator can recognize an incorrect third optical fiber 3-3. In the conventional technique, as indicated as the problems, the operator cannot recognize an incorrect optical fiber, and performs fusion splicing as the next step.

Figure 11:
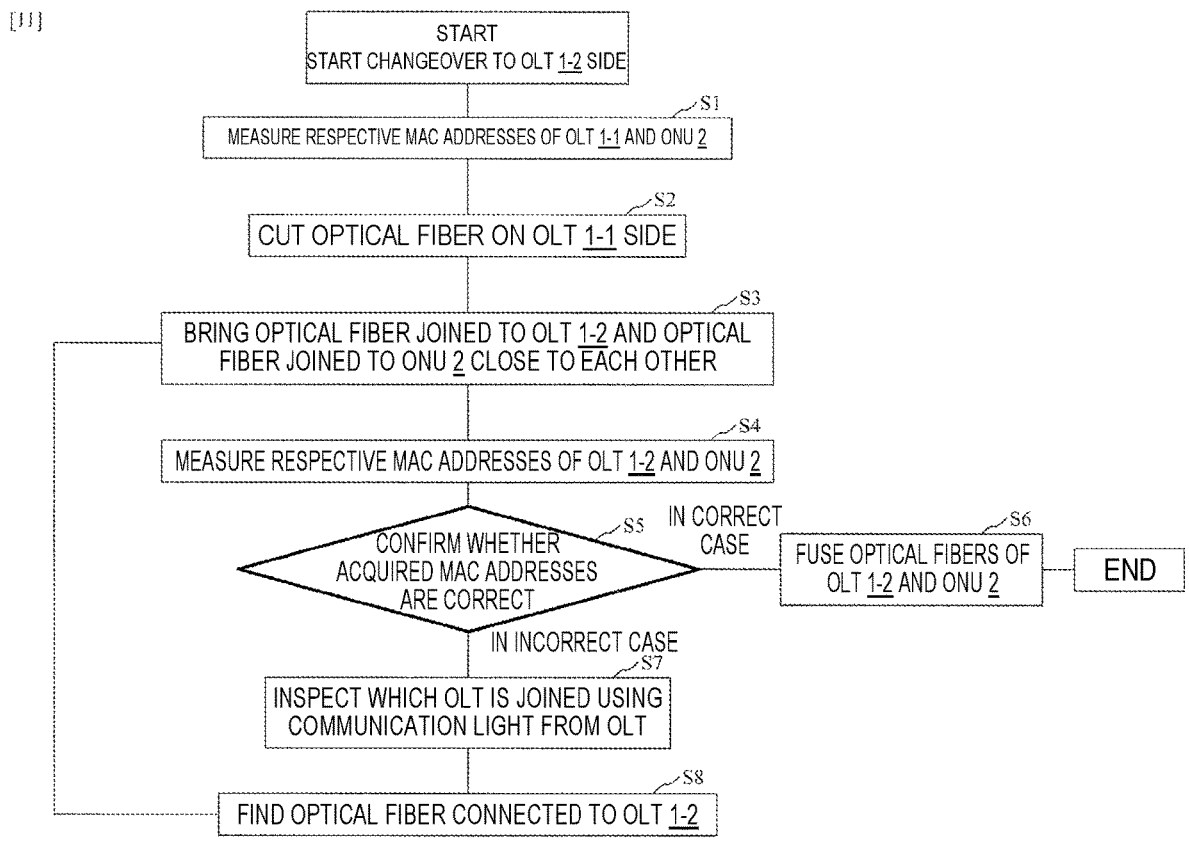
FIG. 11 is a drawing illustrating a procedure of the communication apparatus identification method according to the present disclosure.

FIG. 11 illustrates a flowchart. The operations illustrated in FIGS. 8 to 10 are illustrated as a flow. The MAC address of each of the OLT 1-1 and the ONU 2 is measured (step S1). The first optical fiber 3-1 on the OLT 1-1 side is cut (step S2). The second optical fiber 3-2 joined to the OLT 1-2 and the first optical fiber 3-1 joined to the ONU 2 are brought close to each other (step S3). The MAC address of each of the OLT 1-2 and the ONU 2 is measured (step S4). It is confirmed whether the acquired MAC addresses are correct (step S5). In a correct case, the flow proceeds into fusion splicing between the first and second optical fibers 3-1 and 3-2 respectively joined to the ONU 2 and the OLT 1-2 (step S6), and the flow is completed. In an incorrect case, an optical signal output from the OLT is used to acquire the MAC address, and the number of the OLT is specified from the MAC address (step S7). Then, a correct OLT needs to be found, and the second optical fiber 3-2 joined to the OLT 1-2 is located (step S8), so that the flow is completed.

System Configuration

Figure 12:
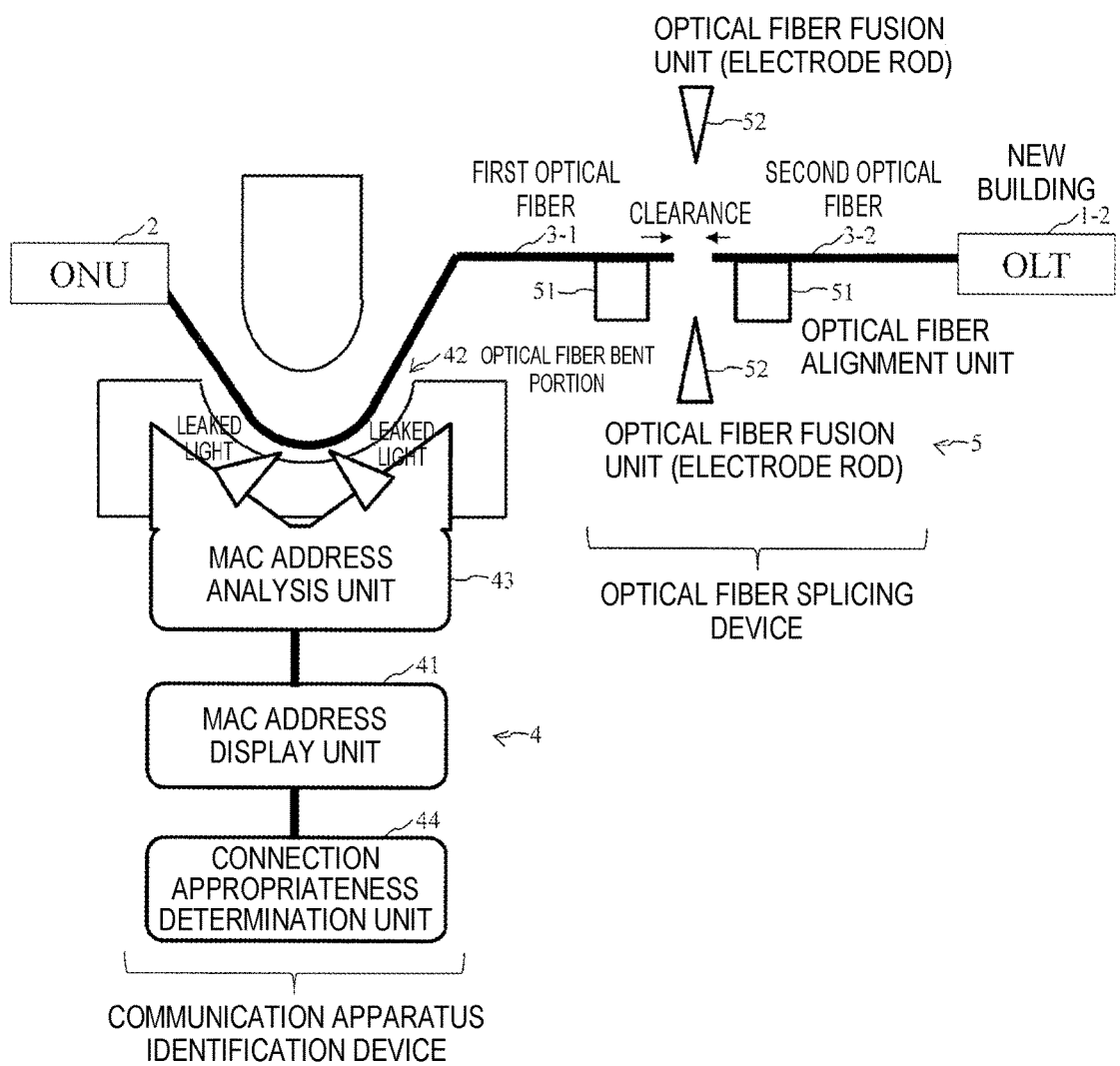
FIG. 12 is a drawing illustrating a configuration of an optical fiber splicing system according to the present disclosure.

FIG. 12 illustrates a configuration of a system for confirming the MAC address of the OLT 1-2 placed in the new building and splicing optical fibers. The optical fiber splicing system includes the communication apparatus identification device 4 and an optical fiber splicing device 5. The communication apparatus identification device 4 includes a MAC address display unit 41, an optical fiber bent portion 42, a MAC address analysis unit 43, and a connection appropriateness determination unit 44. The optical fiber splicing device 5 includes an optical fiber alignment unit 51, and an optical fiber fusion unit 52.

The optical fiber bent portion 42 is a structure for sandwiching the first optical fiber 3-1 between a concave structure and a convex structure, and bending the first optical fiber 3-1 to cause communication light to leak out. The MAC address analysis unit 43 is a circuit unit that receives the communication light leaked out of the optical fiber bent portion 42, and analyzes the MAC addresses of the OLT 1-2 and the ONU 2. The MAC address display unit 41 is a display unit that displays the MAC addresses of the OLT 1-2 and the ONU 2. The connection appropriateness determination unit 44 is a functional unit that determines appropriateness of connection between the OLT 1-2 and the ONU 2.

The optical fiber alignment unit 51 aligns (adjusts the positions of) the opposed first and second optical fibers 3-1 and 3-2 to intentionally provide a clearance, and causes the OLT 1-2 and the ONU 2 to communicate with each other. Thereafter, as a result of the connection appropriateness determination unit 44 or the operator having reached a determination that it is appropriate to splice the first and second optical fibers 3-1 and 3-2, the optical fiber alignment unit 51 aligns the first and second optical fibers 3-1 and 3-2, and eliminates the clearance. Then, the optical fiber fusion unit 52 brings an electrode rod close to surfaces to be spliced of the first and second optical fibers 3-1 and 3-2, and melts glass by means of discharging from the electrode rod to fusion splice the first and second optical fibers 3-1 and 3-2.

Figure 13:
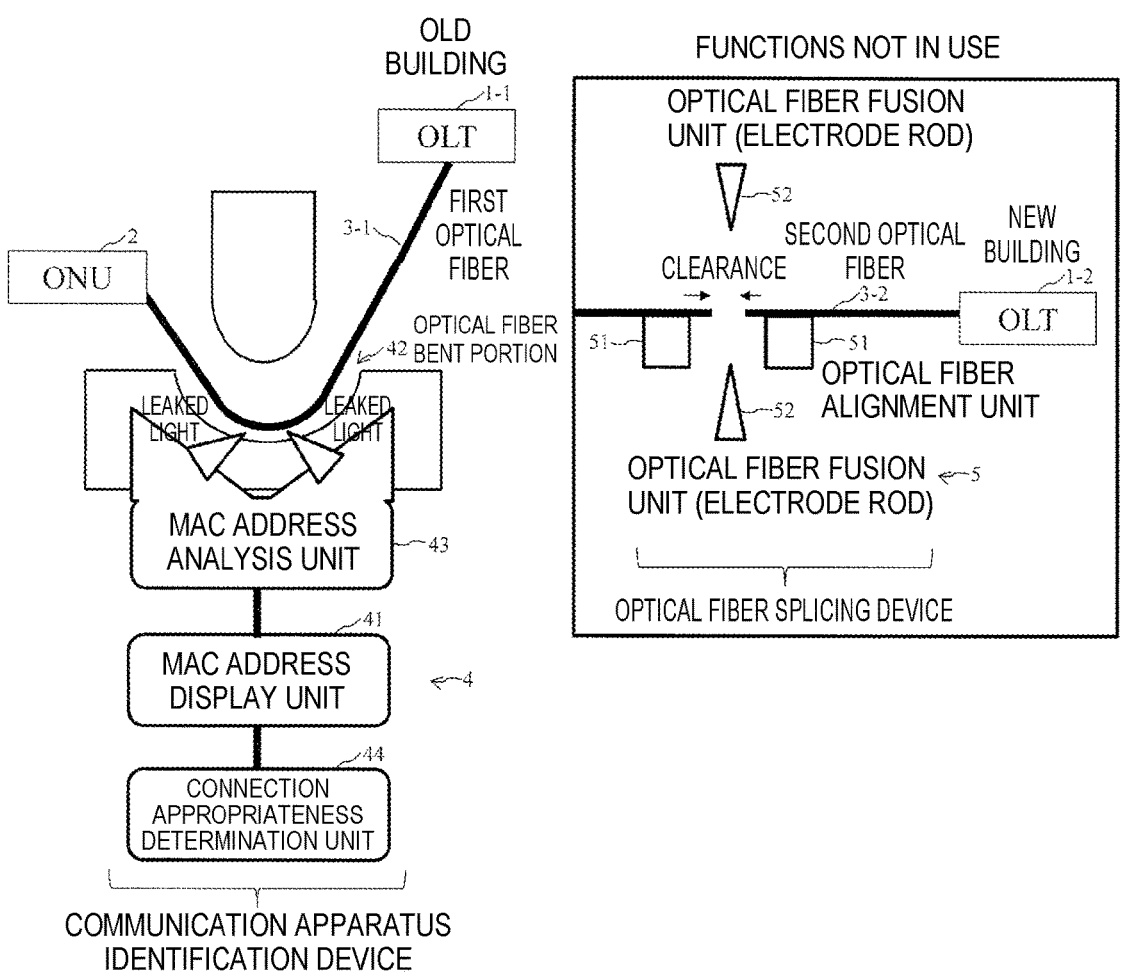
FIG. 13 is a drawing illustrating a configuration of the optical fiber splicing system according to the present disclosure.

FIG. 13 illustrates a configuration of a system for confirming communication light from the old building. The optical fiber splicing device 5 illustrated in FIG. 12 is not used. Using the remaining three functions, the optical fiber bent portion 42, the MAC address analysis unit 43, and the MAC address display unit 41, the MAC address of the OLT 1-1 from the old building can be displayed. That is, the communication apparatus identification device 4 having the optical fiber bent portion 42, the MAC address analysis unit 43, and the MAC address display unit 41 which are three components illustrated in FIG. 12 is adaptable to the old building and the new building, and therefore has high versatility.

Figure 14:
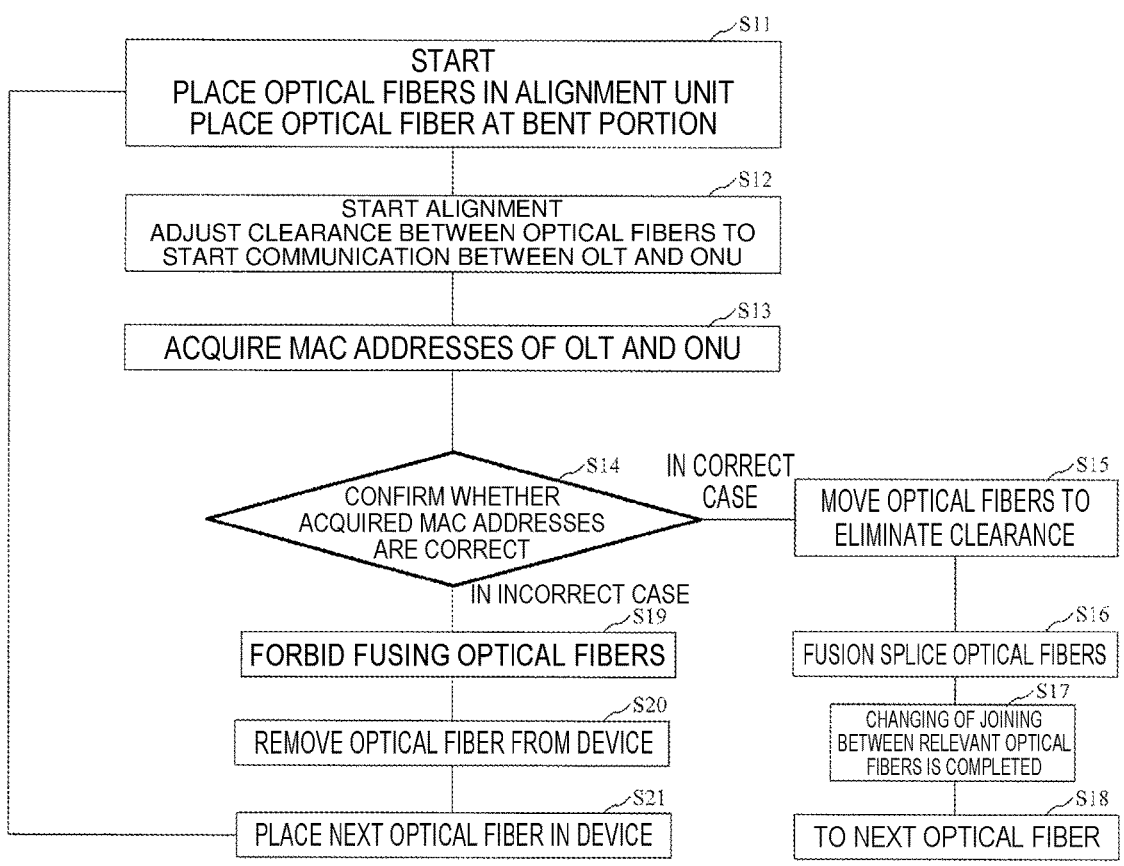
FIG. 14 is a drawing illustrating a procedure of an optical fiber splicing method according to the present disclosure.

FIG. 14 illustrates a flowchart in the system for confirming the MAC address of the OLT 1-2 placed in the new building and fusion splicing optical fibers. FIG. 14 illustrates that the communication apparatus identification device 4 and the optical fiber splicing device 5 illustrated in FIGS. 12 and 13 operate in conjunction with each other.

As a start, opposed optical fibers are placed in the optical fiber alignment unit 51, and the optical fiber on one side is placed at the optical fiber bent portion 42 (step S11). Then, the optical fiber alignment unit 51 aligns (adjusts the positions of) the opposed optical fibers to provide a suitable clearance (step S12). Thereafter, the OLT and the ONU recognize each other, and communication is started between the OLT and the ONU (step S12). Communication light is leaked out at the optical fiber bent portion 42, and the MAC address analysis unit 43 receives and analyzes the leaked light to acquire the MAC addresses of the OLT and the ONU (step S13).

In a case where the acquired MAC addresses are correct in the connection appropriateness determination unit 44 or based on a determination made by the operator (step S14), the optical fiber alignment unit 51 moves the opposed optical fibers to eliminate the clearance (step S15). Then, the optical fiber fusion unit 52 causes the electrode rod to discharge to melt glass of contact surfaces of the opposed optical fibers, thereby joining the opposed optical fibers (step S16). A series of operations are completed (steps S17, S18). In a case where the acquired MAC addresses are incorrect in the connection appropriateness determination unit 44 or based on a determination made by the operator (step S14), fusion of the opposed optical fibers is forbidden in the optical fiber fusion unit 52 (step S19). Accordingly, the incorrect optical fiber is removed from the optical fiber alignment unit 51 (step S20), and another optical fiber is arranged in the optical fiber alignment unit 51 (step S21) to find the MAC address.

Allowable Distance of Clearance

Figure 15:
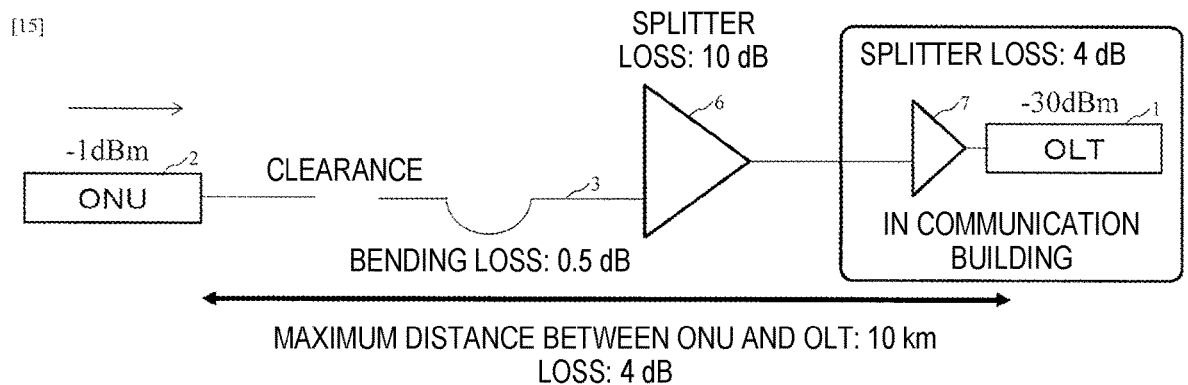
FIG. 15 is a drawing illustrating a loss at each position in the optical access network according to the present disclosure.

FIG. 15 illustrates a facility form of an optical access network, in which the OLT 1 is placed in a communication building, the ONU 2 is placed in a user's house, and the both are connected with the optical fiber 3 and two splitters 6 and 7. The maximum distance between the OLT 1 and the ONU 2 is 10 kilometers. Then, it is illustrated that communication light having a wavelength of 1310 nm output from the ONU 2 reaches the OLT 1, and optical properties and optical losses on the way are illustrated. Output power of the ONU 2 is output at −1 dBm, and the optical signal is reduced in power in a process in which the signal from the ONU 2 propagates, and the weakened signal is received by the OLT 1. The minimum power of light that can be received by the OLT 1 is −30 dBm.

FIG. 15 describes a cause of the reduction in power of the light output from the ONU 2. The ONU 2 and the OLT 1 are spaced apart by 10 kilometers, and when light propagates through the optical fiber 3 by 1 km, light is attenuated by 0.4 dB. Thus, when light propagates through the optical fiber 3 having the length of 10 km, light is attenuated by 4 dB. In addition, light is attenuated at the two splitters 6 and 7 by 10 dB and 4 dB, resulting in a total loss of 14 dB. A loss at the position where the optical fiber 3 is bent is 0.5 dB. The optical fiber 3 having the length of 10 km is spliced at several places, and splicing losses add up to 5.5 dB. Finally, a loss occurs at the clearance.

Figure 16:
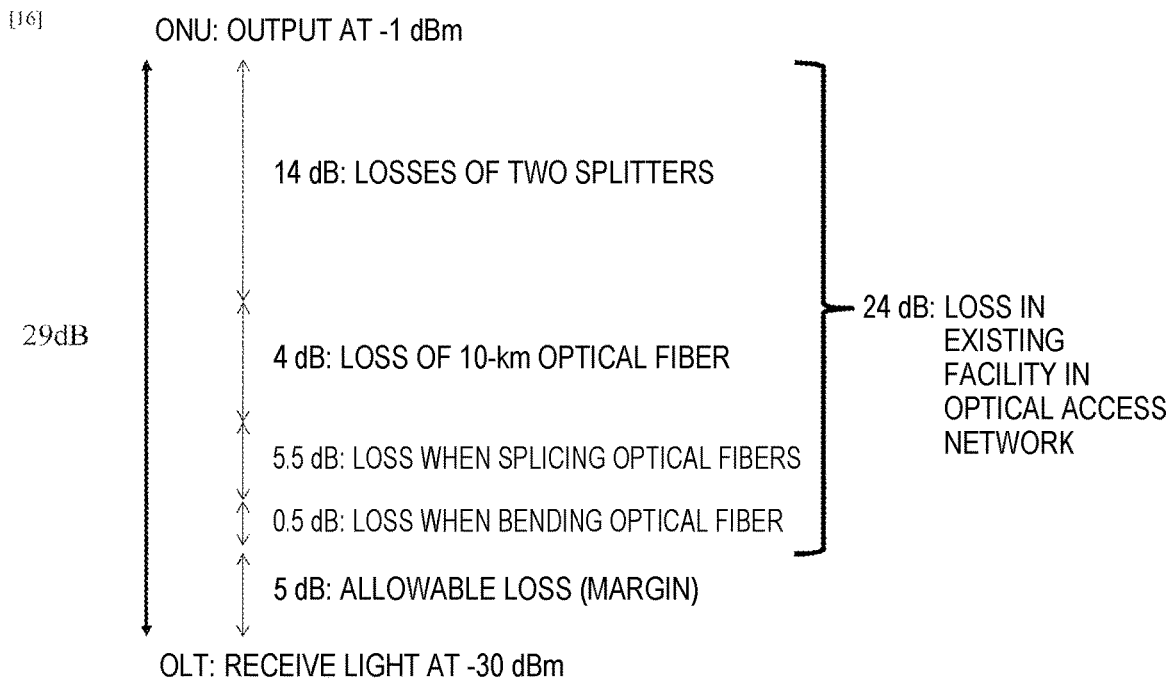
FIG. 16 is a drawing illustrating an allowable loss at a clearance in the optical access network according to the present disclosure.

FIG. 16 summarizes FIG. 15. Since light is output from the ONU 2 at −1 dBm, and is received by the OLT 1 at −30 dBm, the optical access network has a total allowable loss of 29 dB. This 29 dB is distributed to respective losses. Losses in the two splitters 6 and 7 add up to 14 dB. The optical fiber 3 having the length of 10 km has a loss of 4 dB, and the optical fiber 3 has a splicing loss of 5.5 dB. A loss produced when the optical fiber 3 is bent is 0.5 dB. These losses add up to 24 dB. Consequently, an optical margin allowed for the optical access network is 5 dB. This 5 dB corresponds to the allowable loss produced by the clearance in the optical fiber 3.

Figure 17:
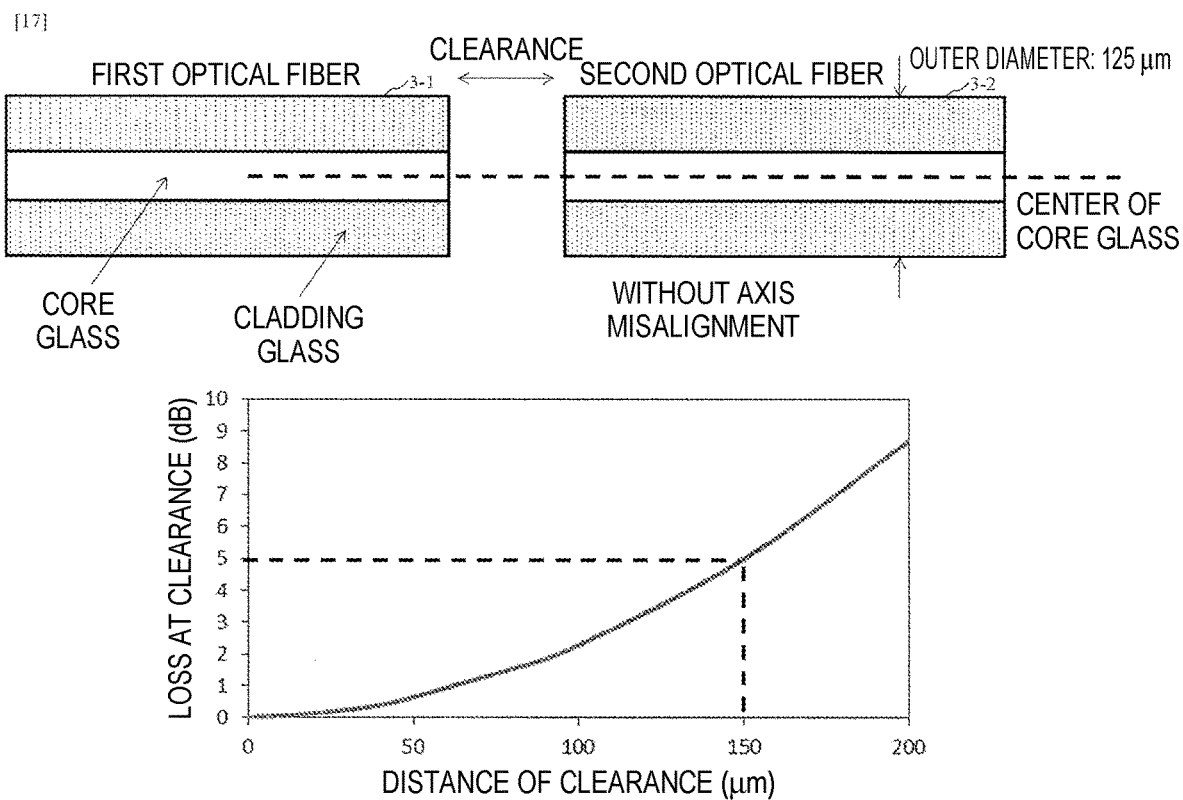
FIG. 17 is a drawing illustrating an allowable distance at the clearance in the optical access network according to the present disclosure.

FIG. 17 illustrates opposing the first and second optical fibers 3-1 and 3-2, providing a clearance between the first and second optical fibers 3-1 and 3-2, and aligning the first and second optical fibers 3-1 and 3-2. An optical signal passes through core glasses of the first and second optical fibers 3-1 and 3-2, and propagates through the first and second optical fibers 3-1 and 3-2 to cause the ONU 2 and the OLT 1 respectively connected to the opposite terminals of the first and second optical fibers 3-1 and 3-2 to communicate with each other. However, providing the clearance between the first and second optical fibers 3-1 and 3-2 produces a loss. However, since there is an optical allowable value (margin) of 5 dB between the OLT 1 and the ONU 2 as illustrated in FIG. 16, the OLT 1 and the ONU 2 can communicate with each other unless the loss produced at the clearance exceeds 5 dB.

FIG. 17 also indicates the clearance distance between the first and second optical fibers 3-1 and 3-2 on the horizontal axis, and the loss produced by the clearance on the vertical axis. As a premise, the axes of the opposed first and second optical fibers 3-1 and 3-2 are not misaligned. FIG. 17 indicates that as the clearance is larger, the loss is higher. It has been described that the allowable optical margin is 5 dB. When the clearance distance becomes greater than or equal to 150 μm, the loss exceeds 5 dB. Consequently, it has been found out that the end surfaces of the first and second optical fibers 3-1 and 3-2 can be spaced at a distance of up to 150 μm. Since cladding glasses of the first and second optical fibers 3-1 and 3-2 have an outer diameter of 125 μm, the end surfaces of the first and second optical fibers 3-1 and 3-2 are spaced at a distance approximately equal to a single optical fiber glass as an indication.

Variation

In the present embodiment, a clearance having a range in which an OLT and an ONU for which appropriateness of connection is to be determined can communicate with each other is provided between optical fibers, and a portion of the optical fibers in the vicinity of the clearance is bent. Then, communication light leaked out of the bent portion of the optical fibers in the vicinity of the clearance is analyzed to acquire the MAC addresses of the OLT and the ONU for which appropriateness of connection is to be determined. Furthermore, appropriateness of connection between the OLT and the ONU for which appropriateness of connection is to be determined is determined based on the MAC addresses of the OLT and the ONU for which appropriateness of connection is to be determined.

As a variation, a clearance having a range in which communication apparatuses other than an OLT and an ONU for which appropriateness of connection is to be determined can communicate with each other may be provided between optical fibers, and a portion of the optical fibers in the vicinity of the clearance may be bent. Then, communication light leaked out of the bent portion of the optical fibers in the vicinity of the clearance may be analyzed to acquire identification numbers (not limited to the MAC addresses) of the communication apparatuses other than the OLT and the ONU for which appropriateness of connection is to be determined. Furthermore, appropriateness of connection between the communication apparatuses other than the OLT and the ONU for which appropriateness of connection is to be determined may be determined based on the identification numbers (not limited to the MAC addresses) of the communication apparatuses other than the OLT and the ONU for which appropriateness of connection is to be determined.

INDUSTRIAL APPLICABILITY

The communication apparatus identification device, the optical fiber splicing system, the communication apparatus identification method, and the optical fiber splicing method of the present disclosure can provide a technique for enabling a communication state to be confirmed not in a communication building but in a work site, and can provide a technique for enabling correct splicing between optical cables to be confirmed before fusion splicing.

REFERENCE SIGNS LIST

1, 1-1, 1-2, 1-3 OLT
2 ONU
3, 3-1, 3-2, 3-3 optical cable, optical fiber, optical fiber glass
4 communication apparatus identification device
5 optical fiber splicing device
6, 7 splitter
41, 41-1, 41-2 MAC address display unit
42 optical fiber bent portion
43 MAC address analysis unit
44 connection appropriateness determination unit
51 optical fiber alignment unit
52 optical fiber fusion unit

The invention claimed is:

1. A communication apparatus identification device comprising:
an optical fiber bent portion obtained by bending a portion of one of optical fibers in a vicinity of a clearance provided between adjacent ends of the optical fibers, an optical line terminal and an optical network unit for which appropriateness of connection is to be determined being connected to opposite ends of the optical fibers, respectively, the clearance having a range in which the optical line terminal and the optical network unit are configured to communicate with each other;
an identification number analysis circuit configured to analyze communication light leaked out of the bent portion of the optical fibers in the vicinity of the clearance to acquire media access control (MAC) addresses of the optical line terminal and the optical network unit; and
a connection appropriateness determinator configured to determine that it is appropriate to connect the optical line terminal and the optical network unit based on acquisition of the MAC address of the optical line terminal in which information about the optical network unit has been registered and the MAC address of the optical network unit.

2. The communication apparatus identification device according to claim 1,
wherein the connection appropriateness determinator is configured to determine that it is inappropriate to connect the optical line terminal and the optical network unit based on acquisition of the MAC address of the optical line terminal in which the information about the optical network unit has not been registered, and based on a failure in acquisition of the MAC address of the optical network unit.

3. The communication apparatus identification device according to claim 1,
wherein the bent portion is provided between the clearance and the optical network unit.

4. The communication apparatus identification device according to claim 1,
wherein the bent portion is provided between the clearance and the optical line terminal.

5. An optical fiber splicing system comprising:
the communication apparatus identification device according to claim 2; and
an optical fiber splicing device configured to selectively connect the adjacent ends of the optical fibers in which the optical line terminal and the optical network unit are connected to the opposite ends, respectively, wherein, when the connection appropriateness determinator determines that it is appropriate to connect the optical line terminal and the optical network unit, the optical fiber splicing device is configured to eliminate the clearance provided between the adjacent ends of the optical fibers to splice the optical fibers at the clearance, and when the connection appropriateness determinator determines that it is inappropriate to connect the optical line terminal and the optical network unit, the optical fiber splicing device is configured to cancel eliminating the clearance provided between the adjacent ends of the optical fibers to cancel splicing the optical fibers at the clearance.

6. The optical fiber splicing system according to claim 5, wherein the bent portion is provided between the clearance and the optical network unit.

7. The optical fiber splicing system according to claim 5, wherein the bent portion is provided between the clearance and the optical line terminal.

8. A method for identifying communication apparatus, the method sequentially comprising:

step of bending a portion of one of optical fibers in a vicinity of a clearance provided between adjacent ends of the optical fibers, an optical line terminal and an optical network unit for which appropriateness of connection is to be determined being connected to opposite ends of the optical fibers, respectively, the clearance having a range in which the optical line terminal and the optical network unit are configured to communicate with each other;

step of analyzing communication light leaked out of the bent portion of the optical fibers in the vicinity of the clearance to acquire media access control (MAC) addresses of the optical line terminal and the optical network unit; and step of determining that it is appropriate to connect the optical line terminal and the optical network unit based on acquisition of the MAC address of the optical line terminal in which information about the optical network unit has been registered and the MAC address of the optical network unit.

9. The method for identifying communication apparatus according to claim 8, further comprising:

step of determining that it is inappropriate to connect the optical line terminal and the optical network unit based on acquisition of the MAC address of the optical line terminal in which information about the optical network unit has been registered, and based on a failure in acquisition of the MAC address of the optical network unit.

10. The method for identifying communication apparatus according to claim 8, wherein the bent portion is provided between the clearance and the optical network unit.

11. The method for identifying communication apparatus according to claim 8, wherein the bent portion is provided between the clearance and the optical line terminal.

12. An optical fiber splicing method sequentially comprising:

step of bending a portion of one of optical fibers in a vicinity of a clearance provided between adjacent ends of the optical fibers, an optical line terminal and an optical network unit for which appropriateness of connection is to be determined being connected to opposite ends of the optical fibers, respectively, the clearance having a range in which the optical line terminal and the optical network unit are configured to communicate with each other;

step of analyzing communication light leaked out of the bent portion of the optical fibers in the vicinity of the clearance to acquire media access control (MAC) addresses of the optical line terminal and the optical network unit;

step of determining that it is appropriate to connect the optical line terminal and the optical network unit based on acquisition of the MAC address of the optical line terminal in which information about the optical network unit has been registered and the MAC address of the optical network unit, and step of selectively connecting the adjacent ends of the optical fibers in which the optical line terminal and the optical network unit are connected to the opposite ends, respectively, wherein, when a determination is made that it is appropriate to connect the optical line terminal and the optical network unit, the clearance provided between the adjacent ends of the optical fibers is eliminated to splice the optical fibers at the clearance, and when a determination is made that it is inappropriate to connect the optical line terminal and the optical network unit, eliminating the clearance provided between the adjacent ends of the optical fibers is canceled to cancel splicing the optical fibers at the clearance.

13. The optical fiber splicing method according to claim 12, further comprising:

step of determining that it is inappropriate to connect the optical line terminal and the optical network unit based on acquisition of the MAC address of the optical line terminal in which the information about the optical network unit has not been registered, and based on a failure in acquisition of the MAC address of the optical network unit.

14. The optical fiber splicing method according to claim 12, wherein the bent portion is provided between the clearance and the optical network unit.

15. The optical fiber splicing method according to claim 12, wherein the bent portion is provided between the clearance and the optical line terminal.

* * * * *